S. D. FRENCH.
Watch Escapement.
No. 57,310. Patented Aug. 21, 1866.
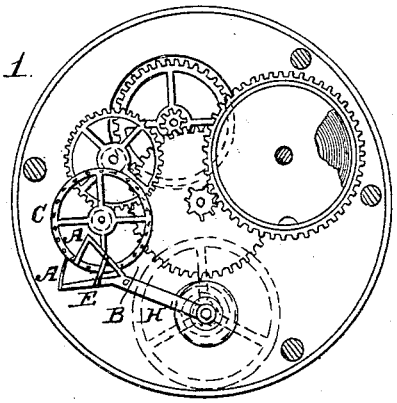
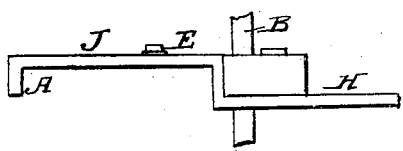
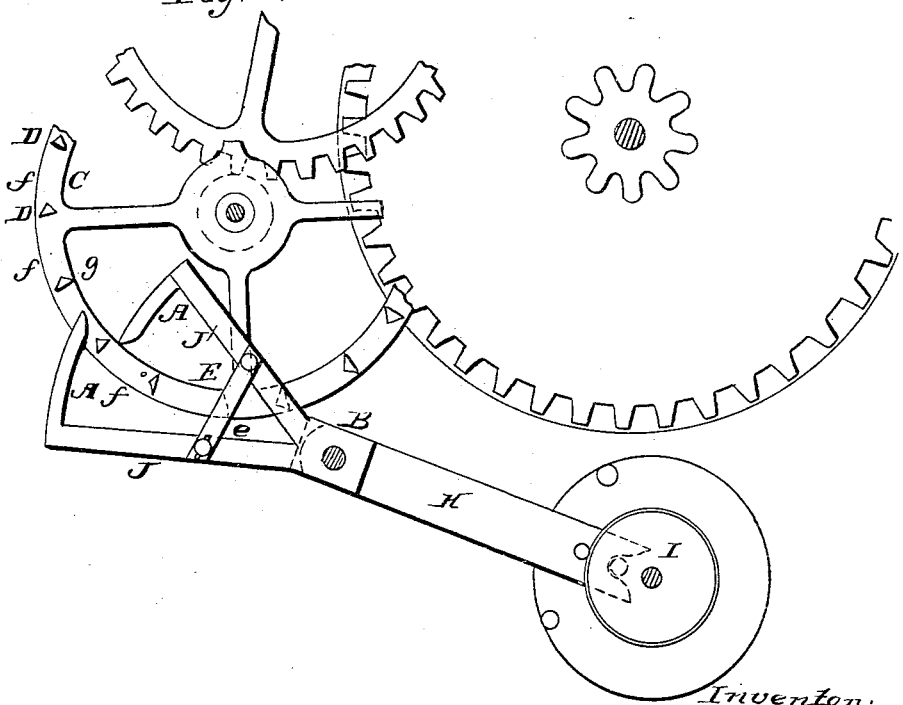
Witnesses:
Jno E Lyon
Wm Truvin
Inventor:
S. D. French
per Munn & Co
Attorneys

UNITED STATES PATENT OFFICE.

SMITH D. FRENCH, OF WABASH, INDIANA.

IMPROVEMENT IN ESCAPEMENTS IN WATCHES.

Specification forming part of Letters Patent No. 57,310, dated August 21, 1866.

*To all whom it may concern:*

Be it known that I, SMITH D. FRENCH, of Wabash, in the county of Wabash and State of Indiana, have invented a new and useful Improvement in Watches; and I do hereby declare that the following is a full, clear, and exact description thereof, which will enable others skilled in the art to make and use the same, reference being had to the accompanying drawings, forming part of this specification, in which—

Figure 1 represents the escapement-wheel, pallets, and other working parts of a watch. Fig. 2 is an enlarged view of those parts to which my invention more particularly relates. Fig. 3 is a side view of the pallet-lever and pallets.

Similar letters of reference indicate like parts.

This improvement consists in a new escapement for watches, wherein the pallets are drawn upon a curve from the staff of pallets as a center, the teeth of the escapement-wheel playing or striking on the concave side of the pallets. The pallets are so connected with the pallet-lever as to enable one to adjust them with respect to each other by means of a bar that extends from one to the other, if by accident or wear they become disordered or untrue.

In ordinary lever-escapements the escapement-wheel and the pallets must be adjusted to each other with accuracy to obtain regularity of motion, and even when great care and much pains are taken in their construction the escapement-wheel teeth will often slip on the pallets and throw the point of the lever against the staff of the balance and stop the motion; but in my improved escapement herein set forth there is little or no possibility of the teeth slipping from the pallets, even if the parts are roughly made or improperly used, because the teeth of the escapement strike back of the faces of the pallets on the concave parts of their arcs.

The drawings represent my escapement applied to the working parts of a watch.

C is the escapement-wheel, with teeth D, whose form is most clearly shown in Fig. 2, which shows on an enlarged scale those parts of a watch which embrace my improvement.

The backs of the teeth D are made flat, and the teeth are beveled thence toward the center of the front, as is indicated at $g$, forming an angle, $f$, at that part of each tooth which comes in contact with the pallets, thereby exposing only a small part of the side of the teeth to the pallets.

The letters A A designate the pallets formed on bars J J', which are pivoted to the long pallet-lever H at the place of its fulcrum B. The bars are held together by a cross-bar, E, one end being pivoted to arm J and the other provided with a slot, $e'$. A pivot or screw is attached to the arm J', and moves in the slot $e'$, and furnishes the means of adjusting the pallets by fixing their bars J J at a greater or less distance apart.

The pallet-lever extends from its staff or pivot in such a direction that when in a state of rest it is in a line which is tangential to the escapement-wheel.

The bars J J diverge from the lever at equal angles and reach over the rim of the escapement-wheel, said bars being elevated above the teeth, so as to move clear of them. The pallets A A are so made and attached to the bars as to reach below the plane in which the bars move, where the teeth of the escapement can engage them.

It will be observed that the length of the bars J J is such as to remove the pallets to a considerable distance from the center about which they move.

I designates the staff of the balance.

One of the advantages which arises from my improvement is that less power is required in the operation of the escapement, owing to the fact that the distance from the pallet staff or pivot B is about twice the distance of the same parts in ordinary escapements, and that consequently the escapement will run with about half the power required in the old escapements; and, besides, less power is required on the mainspring than is ordinarily required in watches, so that the mainspring is less liable to become broken than if it were a stiff spring, and, if it does become broken, there is less danger that the other parts of the watch will be injured. This advantage will be appreciated by watch-repairers and all persons skilled in the art to which this invention belongs, because it is well known that a large proportion of the injuries which occur in watches are caused by the mainsprings being so stiff that when they break they damage or break other parts of the works.

The pallets are of the form of arcs of circles, of which the staff or fulcrum B is the center, and the angular parts of the teeth D of the escapement strike the pallets on their concave sides.

The bars J are loose on the staff B, so as to be at liberty to turn thereon when they are brought nearer together or farther apart. The said bars are connected by means of a cross-bar, E, which is held to them by set-screws passing through elongated holes, to enable such screws to take up different positions on bar E when the pallet-bars are to be adjusted. This arrangement enables me to make compensation for wear or disturbance of the different parts of the escapement.

Having thus described my invention, I claim as new and desire to secure by Letters Patent—

1. So constructing the pallet-arms J J that they shall extend over and above the escapement-wheel, and that the pallets shall be projected downward from their ends across the path of the teeth of the escapement, whereby I am enabled to increase the distance between the pallets and their staff, substantially as and for the purpose above set forth.

2. The adjustable cross-bar E, in combination with the pallet-arms J, operating in the manner and for the purpose herein specified.

SMITH D. FRENCH.

Witnesses:
   E. G. SACKETT,
   A. L. TYER.